United States Patent [19]

Iverson, Jr. et al.

[11] Patent Number: 5,369,099

[45] Date of Patent: Nov. 29, 1994

[54] METHOD AND COMPOSITION FOR INHIBITING THE FORMATION OF HARDWATER DEPOSITS ON FRUIT

[75] Inventors: Thomas Iverson, Jr., Yakima; Joyce Prindle, Olympia, both of Wash.

[73] Assignee: CH₂O Incorporated, Olympia, Wash.

[21] Appl. No.: 52,065

[22] Filed: Apr. 22, 1993

[51] Int. Cl.⁵ .............................. A01N 57/12
[52] U.S. Cl. ........................ 514/108; 47/58
[58] Field of Search ............. 514/108; 47/58

[56] References Cited

U.S. PATENT DOCUMENTS

| | | | |
|---|---|---|---|
| 3,149,151 | 9/1964 | Schiefer et al. | 260/502 |
| 3,150,081 | 9/1964 | Haslam | 210/58 |
| 3,214,454 | 10/1965 | Blaser et al. | 260/429.9 |
| 4,649,025 | 3/1987 | Hwa et al. | 422/15 |
| 4,802,990 | 2/1989 | Inskeep, Jr. | 210/699 |
| 5,171,477 | 12/1992 | Kreh | 252/389.23 |

*Primary Examiner*—Richard L. Raymond
*Assistant Examiner*—Brian G. Bembenick
*Attorney, Agent, or Firm*—Teresa J. Wiant; Delbert J. Barnard

[57] ABSTRACT

The present invention provides an improved method and mixture for cooling fruit on the tree or vine while inhibiting the formation of scales or deposits on the fruit. The method and mixture provide admixing an effective amount of 1-hydroxyethane 1,1-diphosphonic acid (HEDPA) with cooling water before the cooling water is sprayed onto the fruit with cooling water.

12 Claims, 2 Drawing Sheets

METHOD AND COMPOSITION FOR INHIBITING THE FORMATION OF HARDWATER DEPOSITS ON FRUIT

TECHNICAL FIELD

This invention relates to a method and composition for inhibiting the formation of hard water deposits or scales on fruit sprayed with cooling water, and more particularly, to the provision of a cooling solution composed of an effective amount of 1-hydroxyethane 1,1-diphosphonic acid and cooling water.

BACKGROUND INFORMATION

When growing fruit, it is desirable to monitor the temperature of the fruit. If the fruit becomes too hot, it may lose weight, color, and size. In addition, the internal pressure of the fruit may be decreased, resulting in soft fruit. For this reason, when the fruit is apt to become too hot, it is sprayed with cooling water. Generally, after the fruit has been sprayed with cooling water, hard water deposits or scales form on the fruit which are difficult to remove.

The substance 1-hydroxyethane 1,1-diphosphonic acid, (commonly termed HEDPA) has been in commercial use for many years for preventing and removing mineral deposits from heat exchanging equipment such as cooling towers, boilers, and water systems as disclosed in U.S. Pat. No. 4,802,990 (Inskeep, Feb. 7, 1989).

DISCLOSURE OF THE INVENTION

The present invention provides an improved method of cooling fruit while the fruit is still growing by spraying the fruit with cooling water. The improvement comprises substantially preventing hard water scale formation on the fruit by admixing with the cooling water, before spraying, an effective amount of 1-hydroxyethane 1,1-diphosphonic acid (HEDPA). Preferably, the cooling water is sprayed on the fruit when the core temperature of said fruit is 78° F. or greater. This improvement is particularly useful on fruit such as apples.

The present invention also provides a method for cooling fruit. The method comprises providing cooling water and admixing an effective amount of 1-hydroxyethane 1,1-diphosphonic acid (HEDPA) with the cooling water to form a cooling water mixture. Then, the cooling water mixture is sprayed on the fruit. The method may include monitoring the core temperature of the fruit and spraying the fruit with the cooling water mixture when the core temperature of the fruit is at least 78° F.

The present invention also provides a mixture for spraying fruit. The mixture comprises hard cooling water and an effective amount of 1-hydroxyethane 1,1-diphosphonic acid (HEDPA).

Preferably, the effective amount of 1-hydroxyethane 1,1-diphosphonic acid (HEDPA) is at least about ¼ ppm. In a more preferred form of the invention, the effective amount of 1-hydroxyethane 1,1-diphosphonic acid (HEDPA) is between about ¼ ppm to about 5 ppm. In a even more preferred form of the invention, the effective amount of 1-hydroxyethane 1,1-diphosphonic acid (HEDPA) is about 2 ppm.

These and other advantages and features will become apparent from the detailed description of the best mode for carrying out the invention that follows.

BRIEF DESCRIPTION OF THE DRAWINGS

In the drawings, like element designations refer to like parts throughout the several views, and.

BEST MODE FOR CARRYING OUT THE INVENTION

Figure 1:
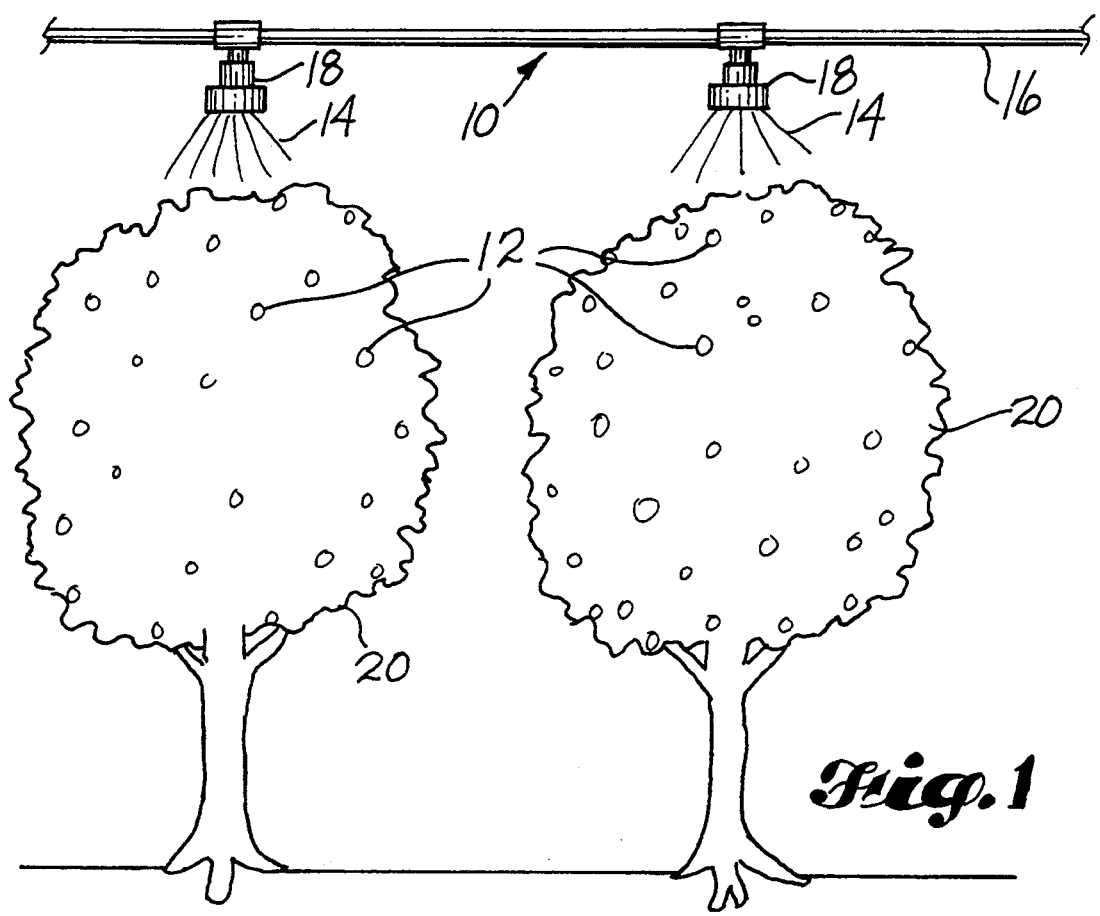
FIG. 1 is a pictorial view of fruit trees in an orchard with an overhead system for spraying cooling water.
Figure 2:
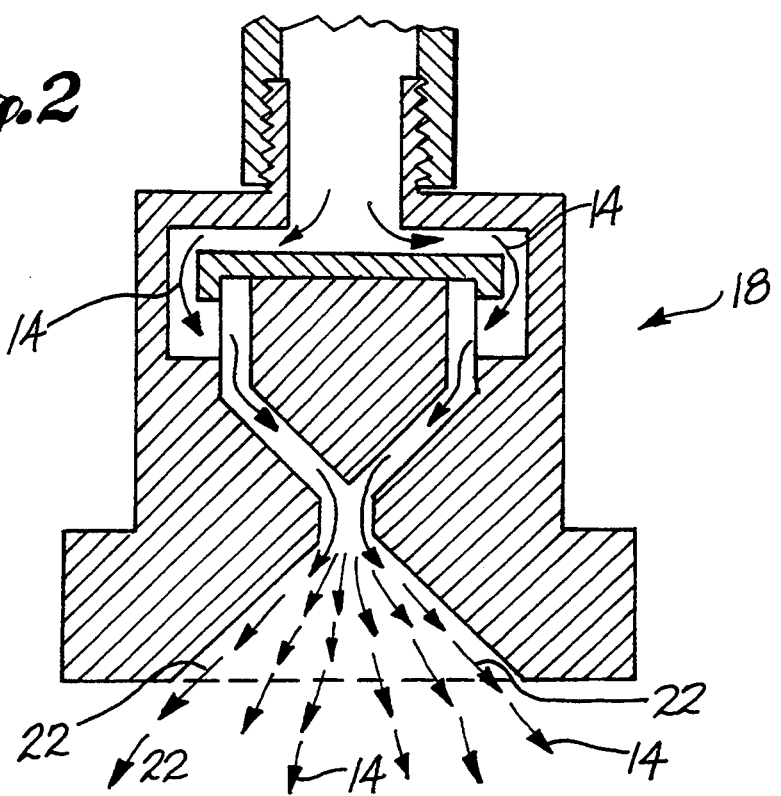
FIG. 2 is a fragmentary pictorial view of a sprayer head.

Referring to FIG. 1, an overhead sprinkler system 10 is provided in an apple orchard. Prior to the apples 12 becoming too hot during the growing season, the apples 12 are cooled by cooling water 14 which is dispersed through the overhead sprinkler system 10. The overhead sprinkler system 10 includes multiple distribution lines 16. Multiple sprayer heads 18 are provided along the distribution lines 16. Each sprayer head 18 is positioned to provide cooling water 14 to the fruit bearing portion of an apple tree 20. Referring to FIG. 2, cooling water 14 passes through the sprayer head 18 and is dispersed through the spray openings 22 in the sprayer head 18 onto the apples 12 on the apple tree 20.

Generally, the core temperature of the apples is monitored. When the core temperature of the apples is 78° F. or greater, cooling water is supplied to the apples. The temperature of the cooling water is less than 78° F., such that upon the cooling water contacting the apples, some of the heat from the apples is transferred to the water, and then the water drips or evaporates from the apples. Preferably, the cooling water is considerably cooler than 78° F.

After the apples have been harvested, they are washed to remove any scale or deposit which is on them. Washing the deposit off of the apples is extremely important since part of the deposit may include or overlay pesticides. Also, after the apples have been washed, a wax is generally applied to the outside of the apple. If a deposit or scale remains upon the apple when the wax is applied, the wax will not be clear and the appearance of the apples will be marred.

Generally the cooling water is supplied from sources such as wells, rivers and lakes. Such water is termed source water. Source water is generally hard, referring to the presence of any or all of the following in the water: calcium, iron, silicate, magnesium, sodium chloride, sodium bicarbonate, sulfate, nitrates, and fluoride. The amount of hardness of water is measured in parts per million (ppm). Typically, source water may have a hardness between about 20 ppm to about 450 ppm. When apples are sprayed with a hard cooling water, a deposit or scale is strongly adhered to the surface of the apples. To remove this stubborn deposit without the use of the present invention, the apples are put through a costly washing cycle.

Figure 3:
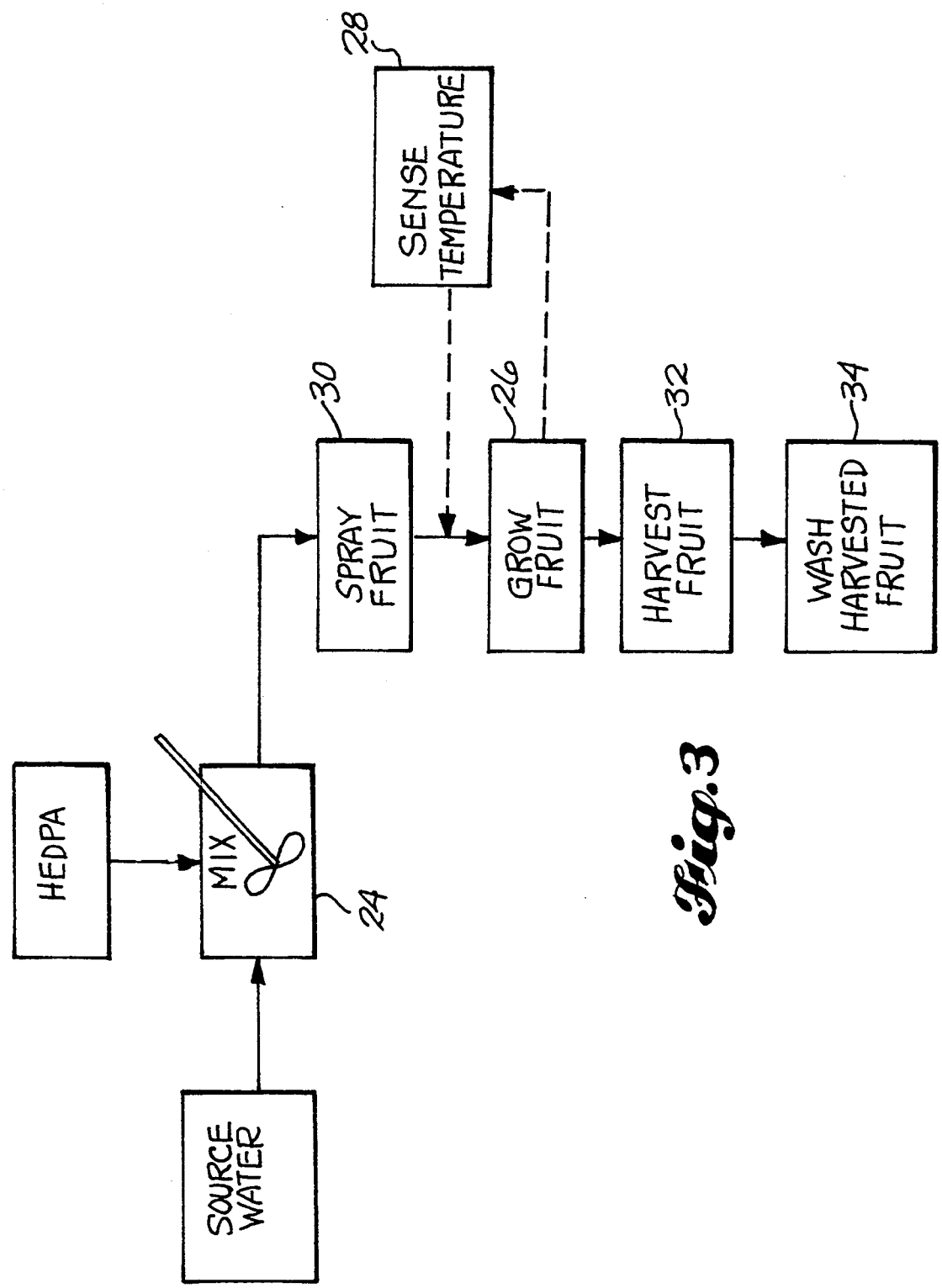
FIG. 3 is flow chart illustrating the method of the present invention.

According to the present invention, as illustrated in FIG. 3, an effective amount of HEDPA is admixed 24 to the source cooling water. As the apples grow 26, the temperature of apples is monitored 28. When the temperature becomes too hot, the apples are sprayed 30 with the cooling water mixture which includes the HEDPA. It has been found that formation of scales or deposits on the apples is severely inhibited, and often is virtually eliminated. Instead, a powder is formed on the apples. After the apples are harvested 32, the powder is easily washed off 34 of the apples.

HEDPA is an alkyl diphosphonate. A commercially available form of HEDPA is termed 1-hydroxyethane 1,1-diphosphonic acid and has the following structure:

$$\begin{array}{c} HO\diagdown \phantom{x} O \phantom{xx} OH \phantom{x} O \phantom{xx} OH \\ \phantom{xx} P-C-P \\ HO\diagup \phantom{xxx} CH_3 \phantom{xx} \diagdown OH \end{array}$$

Herein HEDPA is used to describe a number of behave alike alkyl diphosphonates of the basic structure:

$$\begin{array}{c} HO\diagdown \phantom{x} O \phantom{xx} R \phantom{xx} O \phantom{x} OH \\ \phantom{xx} P-C-P \\ HO\diagup \phantom{xxx} R' \phantom{xx} \diagdown OH \end{array}$$

The following is a list of known HEDPA variants and their structures which indicate what constitutes and may be represented by —R and R':

$$\begin{array}{c} HO\diagdown \phantom{x} O \phantom{xx} H \phantom{xx} O \phantom{x} OH \\ \phantom{xx} P-C-P \\ HO\diagup \phantom{xxx} H \phantom{xx} \diagdown OH \end{array}$$

methylene diphosphonic acid (MDP)

$$\begin{array}{c} HO\diagdown \phantom{x} O \phantom{xx} OH \phantom{x} O \phantom{x} OH \\ \phantom{xx} P-C-P \\ HO\diagup \phantom{xxx} H \phantom{xx} \diagdown OH \end{array}$$

hydroxymethylene diphosphonic acid (HMDP)

$$\begin{array}{c} HO\diagdown \phantom{x} O \phantom{xx} Cl \phantom{xx} O \phantom{x} OH \\ \phantom{xx} P-C-P \\ HO\diagup \phantom{xxx} Cl \phantom{xx} \diagdown OH \end{array}$$

dichloromethylene diphosphonic acid (Cl$_2$MDP)

$$\begin{array}{c} HO\diagdown \phantom{x} O \phantom{xx} OH \phantom{x} O \phantom{x} OH \\ \phantom{xx} P-C-P \\ HO\diagup \phantom{xxxxxxxx} \diagdown OH \end{array}$$

hydroxycyclohexylmethylene diphosphonic acid (HCMDP)

$$\begin{array}{c} HO\diagdown \phantom{x} O \phantom{xx} OH \phantom{x} O \phantom{x} OH \\ \phantom{xx} P-C-P \\ HO\diagup \phantom{xxx} CH_3 \phantom{xx} \diagdown OH \end{array}$$

1-hydroxyethylidene diphosphonic acid (HEDPA)

$$\begin{array}{c} HO\diagdown \phantom{x} O \phantom{xx} OH \phantom{xxx} O \phantom{x} OH \\ \phantom{xx} P——C——P \\ HO\diagup CH_2-CH_2-NH_2 \phantom{x} \diagdown OH \end{array}$$

1-hydroxy-3aminopropane1,1-diphosphonic acid (ADP)

An effective amount of HEDPA may be provided in the cooling water mixture when there is as little as ¼ ppm HEDPA. In some circumstances, additional amounts of HEDPA may be needed. It has been found that the amount of HEDPA which is needed increases as the hardness of the cooling water increases. Seldom is more than 5 ppm HEDPA necessary. In fact, usually no more than 2 ppm is needed. Although, adding additional HEDPA has not been found to negatively impact the inhibition of formation of scale or deposits on the apples. But, as additional HEDPA is added to cooling water, the cost of utilizing this invention increases.

The effective amount of HEDPA is added to the cooling water before the cooling water is applied to the fruit. In a preferred form of the invention, a metering pump is provided and operably attached to the cooling water feed line. The metering pump is set to feed an effective amount of the HEDPA into the cooling water. Then, the cooling water HEDPA mixture is applied to the fruit by the use of an overhead sprayer system.

The present invention provides an economical and simple method and a mixture for inhibiting the formation of deposits or scales on fruit. This method and solution have been found to be effective on apples. It is also been noted that this method would be effective on other fruits which are ripened on a tree or vine, for example, peaches, pears, grapes, blueberries, strawberries, and cucumbers.

EXAMPLE 1

A sprayer system was installed in an orchard. The sprayer system included a metering pump attached to the feed line of the sprayer system. The feed line delivered cooling water from a variety of sources. The cooling water fed through the feed line had a hardness of about 20 ppm. The metering pump metered in 5 ppm of HEDPA to the cooling water. The apple trees were sprayed with the cooling water when the core temperature of the apples was greater than 78° F.

A white powder formed on the surface of the apples. After the apples were harvested, the apples were washed in a water bath. The white powder quickly washed off the apples.

EXAMPLE 2

Example 1 was repeated using cooling water with a hardness of about 450 ppm. A white powder formed on the surface of the apples. After harvest, the white powder was easily washed off of the apples.

EXAMPLE 3

Example 1 was repeated using ¼ ppm of HEDPA. Cooling water was supplied with a hardness of about 20 ppm. A white powder formed on the surface of the apples. After harvest, the white powder was easily washed off of the apples.

EXAMPLE 4

Example 1 was repeated using ¼ ppm of HEDPA. Cooling water was supplied with a hardness of about 140 ppm. A deposit formed on the surface of the apples. A deposit formed on the surface of the apples. After harvest, the deposit was removable with effort from the surface of the apples.

EXAMPLE 5

Example 1 was repeated using ¼ ppm of HEDPA. Cooling water was supplied with a hardness of about 450 ppm. A deposit formed on the surface of the apples. After harvest, the deposit was removable with effort from the surface of the apples.

EXAMPLE 6

Example 1 was repeated using 2 ppm of HEDPA. Cooling water was supplied with a hardness of about 20 ppm. A white powder formed on the surface of the apples. After harvest, the white powder was easily washed off of the apples.

EXAMPLE 7

Example 1 was repeated using 2 ppm of HEDPA. Cooling water was supplied with a hardness of about 450 ppm. A white powder formed on the surface of the apples. After harvest, the white powder was easily washed off of the apples.

EXAMPLE 8

Example 1 was repeated with the omission of the HEDPA.

A deposit formed on the surface of the apples. After the apples were harvested, the deposit was very difficult to wash off of the apples without damaging the apples.

What is claimed:

1. A method of cooling fruit, while the fruit is still on its tree or vine, by the use of source cooling water containing fruit scale forming minerals, comprising:
applying to the surface of the fruit, while the fruit is still on its tree or vine, a mixture of said cooling water and 1-hydroxyethane 1, 1-diphosphonic acid (HEDPA), the latter being present in the mixture in an amount sufficient to alter the fruit scale forming minerals, such that, following evaporation of the cooling water, the minerals will appear as a powder on the fruit that is easily removed from the fruit after the fruit is harvested.

2. The method of claim 1 wherein said effective amount of 1-hydroxyethane 1,1-diphosphonic acid (HEDPA) is at least about ¼ ppm.

3. The method of claim 2 wherein said effective amount of 1-hydroxyethane 1,1-diphosphonic acid (HEDPA) is between about ¼ ppm to about 5 ppm.

4. The method of claim 3 wherein said effective amount of 1-hydroxyethane 1,1-diphosphonic acid (HEDPA) is about 2 ppm.

5. The method of claim 1 wherein said fruit is apples.

6. The method of claim 1 further comprising spraying said cooling water admixed with said 1-hydroxyethane 1,1-diphosphonic acid (HEDPA) on said fruit when the core temperature of said fruit is 78° F. or greater.

7. A method of treating fruit, comprising:
applying to the surface of the fruit, while the fruit is still on its tree or vine, a mixture of cooling water and 1-hydroxyethane 1, 1-diphosphonic acid (HEDPA), said cooling water containing fruit scale forming minerals and said HEDPA being present in the mixture in an amount sufficient to alter the fruit scale forming minerals such that, following evaporation of the cooling water, the minerals will appear as a powder on the fruit that is easily removed from the fruit after the fruit is harvested;
harvesting the fruit; and
removing the powder from the fruit.

8. The solution of claim 7 wherein said effective amount of 1-hydroxyethane 1,1-diphosphonic acid (HEDPA) is at least about ¼ ppm.

9. The solution of claim 8 wherein said effective amount of 1-hydroxyethane 1,1-diphosphonic acid (HEDPA) is between about ¼ ppm to about 5 ppm.

10. The solution of claim 8 wherein said effective amount of 1-hydroxyethane 1,1-diphosphonic acid (HEDPA) is about 2 ppm.

11. The solution of claim 7 wherein said fruit is apples.

12. The solution of claim 7 further comprising spraying said cooling water admixed with said 1-hydroxyethane 1,1-diphosphonic acid (HEDPA) on said fruit when the core temperature of said fruit is 78° F. or greater.

* * * * *

UNITED STATES PATENT AND TRADEMARK OFFICE
CERTIFICATE OF CORRECTION

PATENT NO. : 5,369,099
DATED : November 29, 1994
INVENTOR(S) : Thomas Iverson Jr. and Joyce Prindle It is certified that error appears in the above-identified patent and that said Letters Patent is hereby corrected as shown below:

On title page, item [54] and col. 1, line 4, "HARDWATER" should read —HARD WATER—.

In column 1, line 66, "in a" should be -- in an --.

Signed and Sealed this

Twenty-ninth Day of August, 1995

Attest:

BRUCE LEHMAN

Attesting Officer    Commissioner of Patents and Trademarks